United States Patent
Liu

(10) Patent No.: US 10,299,193 B2
(45) Date of Patent: *May 21, 2019

(54) NETWORK ACCESS METHOD AND MOBILE COMMUNICATIONS TERMINAL

(71) Applicant: GUANGDONG OPPO MOBILE TELECOMMUNICATIONS CORP., LTD., Dongguan, Guangdong (CN)

(72) Inventor: Hai Liu, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/329,958

(22) PCT Filed: Mar. 24, 2016

(86) PCT No.: PCT/CN2016/077205
§ 371 (c)(1),
(2) Date: Jan. 27, 2017

(87) PCT Pub. No.: WO2016/173349
PCT Pub. Date: Nov. 3, 2016

(65) Prior Publication Data
US 2017/0273010 A1    Sep. 21, 2017

(30) Foreign Application Priority Data

Apr. 30, 2015   (CN) .......................... 2015 1 0221780

(51) Int. Cl.
*H04W 8/18*     (2009.01)
*H04W 48/16*    (2009.01)
(Continued)

(52) U.S. Cl.
CPC ............ *H04W 48/16* (2013.01); *H04W 48/18* (2013.01); *H04W 60/00* (2013.01); *H04W 8/18* (2013.01)

(58) Field of Classification Search
CPC . H04W 4/042; H04W 8/02–16; H04W 48/16; H04W 48/18; H04W 60/00; H04W 84/042
(Continued)

(56) References Cited

U.S. PATENT DOCUMENTS 6,127,849 A    10/2000   Walker
6,356,106 B1    3/2002   Greeff
(Continued)

FOREIGN PATENT DOCUMENTS

CN    1768542 A    5/2006
CN    1968502 A    5/2007
(Continued)

OTHER PUBLICATIONS

3GPP TS 24.008 V13.1.0 (Mar. 2015); 3rd Generation Partnership Project; Technical Specification Group Core Network and Terminals; Mobile radio interface Layer 3 specification; Core network protocols; Stage 3 (Release 13).*
(Continued)

*Primary Examiner* — Marcus Hammonds
(74) *Attorney, Agent, or Firm* — Ladas & Parry LLP

(57) ABSTRACT

Disclosed are a network access method and a mobile communications terminal, said method comprising the following steps: if a current visited public land mobile network identifier is not present in a network log file of a mobile communications terminal, then obtaining said current visited public land mobile network identifier and storing same in a network log file of said mobile communications terminal; simultaneously adding to an equivalent public land mobile
(Continued)

network list the current visited public land mobile network identifier and home public land mobile network identifier in the network log file of said mobile communications terminal; searching for a network according to said equivalent public land mobile network list, and if any network is found in said equivalent public land mobile network list, then executing a network registration operation for said mobile communications terminal.

15 Claims, 5 Drawing Sheets

(51) Int. Cl.
*H04W 48/18* (2009.01)
*H04W 60/00* (2009.01)

(58) Field of Classification Search
USPC ...................... 455/432.1, 434, 433
See application file for complete search history.

(56) References Cited

U.S. PATENT DOCUMENTS

| | | | |
|---|---|---|---|
| 6,359,815 | B1 | 3/2002 | Sato |
| 6,525,618 | B2 | 2/2003 | Wood |
| 7,093,041 | B2 | 8/2006 | Gasparik |
| 8,041,342 | B2 | 10/2011 | Chang |
| 8,774,802 | B2 | 7/2014 | Kim |
| 9,538,433 | B2 | 1/2017 | Zhang et al. |
| 9,614,703 | B2 | 4/2017 | Rahman et al. |
| 9,767,889 | B1 | 9/2017 | Powers et al. |
| 2003/0016550 | A1 | 1/2003 | Yoo |
| 2003/0161196 | A1 | 8/2003 | Park |
| 2004/0192306 | A1* | 9/2004 | Elkarat ............... H04W 8/06 455/435.2 |
| 2004/0192328 | A1 | 9/2004 | Giacalone |
| 2004/0224689 | A1 | 11/2004 | Raghuram |
| 2006/0052100 | A1 | 3/2006 | Almgren |
| 2006/0099943 | A1 | 5/2006 | Koo |
| 2006/0211420 | A1 | 9/2006 | Ophir et al. |
| 2007/0191006 | A1 | 8/2007 | Carpenter |
| 2007/0259646 | A1 | 11/2007 | Hu |
| 2008/0031073 | A1 | 2/2008 | Brandt |
| 2008/0057948 | A1* | 3/2008 | Mittal ............... H04W 48/16 455/426.1 |
| 2008/0220745 | A1 | 9/2008 | Chang |
| 2009/0196265 | A1* | 8/2009 | Mariblanca Nieves .................. H04W 8/065 370/338 |
| 2010/0099403 | A1 | 4/2010 | Kim |
| 2011/0098039 | A1 | 4/2011 | Lim |
| 2011/0115307 | A1 | 5/2011 | Yoshie |
| 2011/0237250 | A1 | 9/2011 | Horn |
| 2012/0064883 | A1* | 3/2012 | Kim ............... H04W 8/205 455/422.1 |
| 2012/0243467 | A1 | 9/2012 | Vallurupalli |
| 2013/0109377 | A1* | 5/2013 | Al-Khudairi ....... H04W 48/16 455/432.1 |
| 2014/0028607 | A1 | 1/2014 | Tan |
| 2014/0031033 | A1* | 1/2014 | Juang ............... H04W 48/18 455/432.1 |
| 2014/0031035 | A1* | 1/2014 | Tagg ............... H04W 48/18 455/433 |
| 2014/0073320 | A1* | 3/2014 | Dhanda ............... H04W 48/16 455/433 |
| 2014/0235241 | A1* | 8/2014 | Sharan ............... H04W 60/04 455/435.2 |
| 2014/0342732 | A1 | 11/2014 | Manalo et al. |
| 2015/0119023 | A1 | 4/2015 | Zhang |
| 2015/0205751 | A1 | 7/2015 | Oh et al. |
| 2015/0208293 | A1 | 7/2015 | Zhang et al. |
| 2016/0262155 | A1* | 9/2016 | Lindoff ............... H04W 76/14 |
| 2017/0085403 | A1 | 3/2017 | Sun et al. |
| 2017/0164270 | A1* | 6/2017 | Jiang ............... H04W 48/16 |
| 2017/0215134 | A1 | 7/2017 | Liu |
| 2017/0223618 | A1 | 8/2017 | Liu |
| 2017/0223620 | A1 | 8/2017 | Liu |
| 2017/0311231 | A1 | 10/2017 | Liu |

FOREIGN PATENT DOCUMENTS

| | | |
|---|---|---|
| CN | 101103645 A | 1/2008 |
| CN | 101212802 A | 7/2008 |
| CN | 101355479 A | 1/2009 |
| CN | 101616396 A | 12/2009 |
| CN | 101657005 A | 2/2010 |
| CN | 102196531 A | 9/2011 |
| CN | 102395175 A | 3/2012 |
| CN | 102724735 A | 10/2012 |
| CN | 102752832 A | 10/2012 |
| CN | 103068009 A | 4/2013 |
| CN | 103188638 A | 7/2013 |
| CN | 103313227 A | 9/2013 |
| CN | 103716774 A | 4/2014 |
| CN | 103906180 A | 7/2014 |
| CN | 104486818 A | 4/2015 |
| CN | 104853404 A | 8/2015 |
| CN | 104853410 A | 8/2015 |
| CN | 104869615 A | 8/2015 |
| CN | 104902459 A | 9/2015 |
| CN | 104902460 A | 9/2015 |
| CN | 104902533 A | 9/2015 |
| CN | 104902541 A | 9/2015 |
| CN | 104902542 A | 9/2015 |
| CN | 104980997 A | 10/2015 |
| CN | 105101081 A | 11/2015 |
| EP | 1703752 A2 | 9/2005 |
| EP | 2429224 A1 | 3/2012 |
| EP | 2555547 A1 | 2/2013 |
| WO | 2013067014 A1 | 5/2013 |
| WO | 2016173377 A1 | 11/2016 |

OTHER PUBLICATIONS

Huawei et al: "The MDT applicability of Equivalent PLMN identies", 3GPP Draft R3-111912_MDT_EPLMN, 3rd Generation Partnership Project (3GPP), Moble Competence Centre ; 650, Route Des Lucioles : F-06921 Sophia-Antipolis Cedex ; France, vol, RAN WG3, No. Athens, Greece: Aug. 22, 2011, Sep. 9, 2011 (Sep. 9, 2011), XP050541542 , [retrieved on Sep. 9, 2011]* case 3 , case 4, see also box on p. 2; p. 2*.

* cited by examiner

NETWORK ACCESS METHOD AND MOBILE COMMUNICATIONS TERMINAL

CROSS REFERENCE TO RELATED APPLICATION

This application is a US national phase application based upon an International Application No. PCT/CN2016/077205, filed on Mar. 24, 2016, which claims priority to Chinese Application No. 201510221780.7, filed Apr. 30, 2015. The entire disclosures of each of the above applications are incorporated herein by reference.

BACKGROUND OF THE DISCLOSURE

1. Field of the Disclosure

The present disclosure relates to a mobile communication technology, more particularly, to a method and a mobile communication terminal of accessing a network.

2. Description of the Related Art

A public land mobile network is a network established and operated by the government or operators authorized by the government to provide the public with land mobile communication services. This network needs to be interconnected with a public switched telephone network (PSTN) so as to form a regional or nationwide communication network. When a subscriber roams, the subscriber's mobile communication terminal, such as a mobile phone, needs to re-access the network so as to obtain the information of the public land mobile network.

Currently, most of the mobile communication terminals, when being turned on, will search the registered public land mobile network (RPLMN) first, and then select the home public land mobile network (HPLMN), the equivalent home public land mobile network (EHPLMN) or the Visited Public Land Mobile Network (VPLMN). When in a foreign country the mobile communication terminal turns on in the first time and is in a roaming status, the mobile communication terminal searches the RPLMN by default because it does not know it is in the roaming status. However, none of RPLMNs existed in the foreign country causes a failure of searching network. Even if the mobile communication terminal tries search network in the foreign country again, it will continue to search for the RPLMN, causing another failure of searching network. As a result, a large amount of time of searching network is consumed and the network access efficiency is significantly reduced.

SUMMARY

The present disclosure provides a method and a mobile communication terminal of accessing a network, thus being able to reduce time spent by the mobile communication terminal in network searching and increase the network access efficiency.

In a first aspect of the present disclosure, a method of accessing a network is provided. The method includes follows.

An identity of a current Visited Public Land Mobile Network (VPLMN) is obtained and the identity of the current VPLMN is stored in a network record document of a mobile communication terminal when the identity of the current VPLMN does not exist in the network record document of the mobile communication terminal.

The identity of the current VPLMN and an identity of a Home Public Land Mobile Network (HPLMN) are added in the network record document of the mobile communication terminal to an Equivalent Public Land Mobile Network (EPLMN) list simultaneously.

A network search according to the EPLMN list is performed.

A network registration operation of the mobile communication terminal is performed when any one network in the EPLMN list is searched.

According to an embodiment in conjunction to the first aspect of the present disclosure, before obtaining the identity of the current VPLMN and storing the identity of the current VPLMN in the network record document of the mobile communication terminal when the identity of the current VPLMN does not exist in the network record document of the mobile communication terminal, the method further includes the following step.

Whether the identity of the current VPLMN exists in the network record document of the mobile communication terminal is determined.

According to an embodiment in conjunction to the first aspect of the present disclosure, before adding the identity of the current VPLMN and the identity of the HPLMN in the network record document of the mobile communication terminal to the EPLMN list simultaneously, the method further includes the following step.

The identity of the current VPLMN and the identity of the HPLMN are read from the network record document of the mobile communication terminal.

According to an embodiment in conjunction to the first aspect of the present disclosure, the network search is performed according to the EPLMN list includes the following step.

A broadcasting-network access instruction is transmitted according to the EPLMN list thus added to perform a network searching operation.

According to an embodiment in conjunction to the first aspect of the present disclosure, the step of whether the identity of the current VPLMN exists in the network record document of the mobile communication terminal is determined includes the following steps.

Whether a signal intensity of the HPLMN is lower than a preset network threshold value is determined.

Whether the identity of the current VPLMN exists in the network record document of the mobile communication terminal is determined when the signal intensity of the HPLMN is lower than the preset network threshold value.

In a second aspect of the present disclosure, a mobile communication terminal is provided. The mobile communication terminal includes an acquisition unit, a list adding unit, a network searching unit, and a network registration unit.

The acquisition unit is configured to obtain an identity of a current VPLMN and store the identity of the current VPLMN in a network record document of the mobile communication terminal when the identity of the current VPLMN does not exist in the network record document of the mobile communication terminal.

The list adding unit is configured to add the identity of the current VPLMN and an identity of an HPLMN in the network record document of the mobile communication terminal to an EPLMN list simultaneously.

The network searching unit is configured to perform a network search according to the EPLMN list.

The network registration unit is configured to perform a network registration operation of the mobile communication terminal when any one network in the EPLMN list is searched.

According to an embodiment in conjunction to the second aspect of the present disclosure, the mobile communication terminal further includes a judgment unit.

The judgment unit is configured to determine whether the identity of the current VPLMN exists in the network record document of the mobile communication terminal.

According to an embodiment in conjunction to the second aspect of the present disclosure, the mobile communication terminal further includes a read unit.

The read unit is configured to read the identity of the VPLMN and the identity of the HPLMN from the network record document of the mobile communication terminal.

According to an embodiment in conjunction to the second aspect of the present disclosure, the network searching unit is configured to perform the following function.

A broadcasting-network searching instruction is transmitted by the network searching unit according to the EPLMN list so as to perform a network searching operation.

According to an embodiment in conjunction to the second aspect of the present disclosure, the judgment unit includes a threshold judgment subunit and a network identity judgment subunit.

The threshold judgment subunit is configured to determine whether a signal intensity of the HPLMN is lower than a preset network threshold value.

The network identity judgment subunit is configured to determine whether the identity of the current VPLMN exists in the network record document of the mobile communication terminal when the signal intensity of the HPLMN is lower than the preset network threshold value.

In a third aspect of the present disclosure, a mobile communication terminal includes a processor and a memory storing a plurality of program instructions executable by the processor to perform operations as follows.

An identity of a current Visited Public Land Mobile Network (VPLMN) is obtained and the identity of the current VPLMN is stores in a network record document of a mobile communication terminal when the identity of the current VPLMN does not exist in the network record document of the mobile communication terminal.

The identity of the current VPLMN and an identity of a Home Public Land Mobile Network (HPLMN) are added in the network record document of the mobile communication terminal to an Equivalent Public Land Mobile Network (EPLMN) list simultaneously.

A network search is performed according to the EPLMN list.

A network registration operation of the mobile communication terminal is performed when any one network in the EPLMN list is searched.

According to an embodiment in conjunction to the third aspect of the present disclosure, the processor further executes the plurality of program instructions to perform the following step before an identity of a current Visited Public Land Mobile Network (VPLMN) is obtained and the identity of the current VPLMN is stored in a network record document of a mobile communication terminal when the identity of the current VPLMN does not exist in the network record document of the mobile communication terminal.

Whether the identity of the current VPLMN exists in the network record document of the mobile communication terminal is determined.

According to an embodiment in conjunction to the third aspect of the present disclosure, the processor further executes the plurality of program instructions to perform the following step before the identity of the current VPLMN and an identity of a Home Public Land Mobile Network (HPLMN) are added in the network record document of the mobile communication terminal to an Equivalent Public Land Mobile Network (EPLMN) list simultaneously.

The identity of the current VPLMN and the identity of the HPLMN are read from the network record document of the mobile communication terminal.

According to an embodiment in conjunction to the third aspect of the present disclosure, when the processor executes the plurality of program instructions to perform the step of performing a network search according to the EPLMN list, the processor executes the plurality of program instructions to perform the operation as follow.

A broadcasting-network access instruction is transmitted according to the EPLMN list thus added to perform a network searching operation.

According to an embodiment in conjunction to the third aspect of the present disclosure, when the processor executes the plurality of program instructions to perform the step of determining whether the identity of the current VPLMN exists in the network record document of the mobile communication terminal, the processor executes the plurality of program instructions to perform the following steps.

Whether a signal intensity of the HPLMN is lower than a preset network threshold value is determined.

Whether the identity of the current VPLMN exists in the network record document of the mobile communication terminal is determined when the signal intensity of the HPLMN is lower than the preset network threshold value.

According to the embodiments of the present disclosure, identification of the current VPLMN is obtained and stored in the network record document of the mobile communication terminal when the identification of the current VPLMN does not exist in the network record document of the mobile communication terminal. The identification of the current VPLMN and the identification of the HPLMN in the network record document of the mobile communication terminal are added to the EPLMN list simultaneously. The network search is performed according to the EPLMN list. The network registration operation of the mobile communication terminal is performed when any one network in the EPLMN list is searched. Through obtaining the identification of the current VPLMN of the mobile communication terminal and storing the identification of the current VPLMN in the network record document, the network searching is simultaneously performed by simultaneously adding the identification of the current VPLMN and the identification of the HPLMN in the network record document to the EPLMN list. In this manner, the success rate and speed of the mobile communication terminal to access the network at the current visited location can be greatly improved, which is very advantageous to shorten the standby time of the user when communicating (ideally the mobile communication terminal could only need a few seconds to complete the network access). As a result, it is very advantageous to improve the user experience in communication.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

A public land mobile network (PLMN) is a wireless communication system, which is a network established and operated by the government or operators authorized by the government to provide the public with land mobile communication services. This network is usually interconnected with a public switched telephone network (PSTN) so as to form a regional or nationwide communication network. The PLMN includes the following types:

(1). Registered public land mobile network (RPLMN): a PLMN that is registered before a mobile communication terminal is last turned off or offline.

(2). Equivalent public land mobile network (EPLMN): a PLMN has a same rank as a PLMN currently selected by the mobile communication terminal, both have the same priority.

(3). Home public land mobile network (HPLMN): a PLMN to which a subscriber of the mobile communication terminal belongs, which can be identified through a universal subscriber identity module (USIM) of the mobile communication terminal, for a specific subscriber, there is only one PLMN for a home location.

(4). Equivalent home public land mobile network (EHPLMN): a local PLMN has the same rank as the PLMN currently selected by the mobile communication terminal.

(5). Visited public land mobile network (VPLMN): a PLMN visited by the subscriber of the mobile communication terminal. The PLMN and Mobile County Code (MCC), Mobile Network Code (MNC) of International Mobile Subscriber Identity (IMSI) existing in a SIM card are not completely the same, when the mobile communication terminal loses coverage, one VPLMN will be selected.

In all of the following embodiments, the mobile communication terminal may include a smart phone, a tablet computer, a notebook computer, a palmtop computer, and a mobile Internet device (MID), etc. The mobile communication terminal in the present embodiment mainly refers to a smart mobile communication terminal device, such as a smart phone or a tablet computer, which can perform communication network connections. The home location is a home location of a home operator described in a subscriber identity module inside the mobile communication terminal. The visited location is a destination visited by a subscriber carrying the mobile communication terminal.

Detailed descriptions of methods of accessing a network according to embodiments of the present disclosure are provided as follows with reference to FIG. 1 to FIG. 2.

Figure 1:
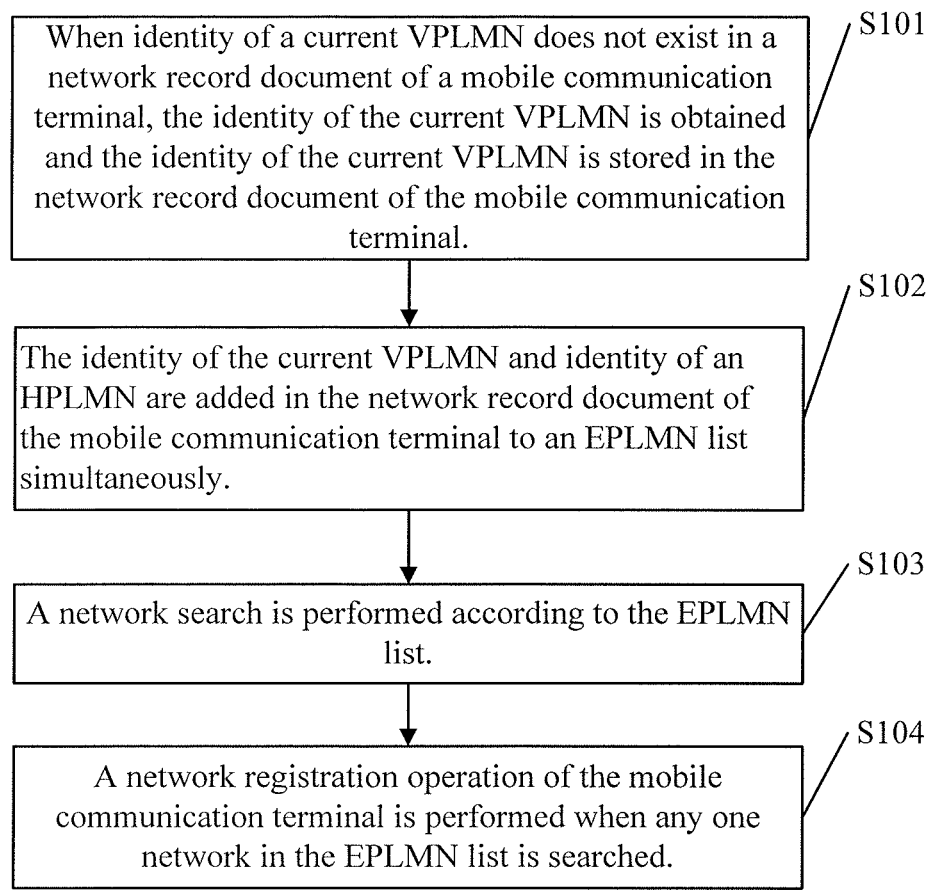
FIG. 1 is a flow chart of a method for connecting to a network according to an embodiment of the present disclosure.

A description is provided with reference to FIG. 1. FIG. 1 is a flow chart of a method for connecting to a network according to an embodiment of the present disclosure. The method includes but is not limited to the following blocks:

Block S101: When an identity of a current VPLMN does not exist in a network record document of a mobile communication terminal, the identity of the current VPLMN is obtained and the identity of the current VPLMN is stored in the network record document of the mobile communication terminal.

In greater detail, the network record document of the mobile communication terminal refers to a document in the mobile communication terminal used for recording network identity information, such as an embedded file system (EFS). When a subscriber carrying the mobile communication terminal comes to a specific visited location for the first time, there is no record of the visited location in the network record document of the mobile communication terminal, that is, an identity of a VPLMN does not exist. Then, it is necessary to add the identity of the VPLMN to the network record document of the mobile communication terminal to facilitate the subscriber carrying the mobile communication terminal to obtain the identity of the VPLMN through reading the network record document when coming to the visited location for the second time or for many times subsequently. When the subscriber carrying the mobile communication terminal comes to the visited location after the first time, there is the record of the visited location in the network record document of the mobile communication terminal, that is, the identity of the VPLMN exists. Then, the identity of the VPLMN in the network record document can be directly read through the mobile communication terminal.

Block S102: The identity of the current VPLMN and an identity of an HPLMN are added in the network record document of the mobile communication terminal to an EPLMN list simultaneously.

In greater detail, the EPLMN list is mainly configured to store identity information of a plurality of EPLMNs. In block S101, the identity of the VPLMN thus obtained is stored in the network record document of the mobile communication terminal. The network record document of the mobile communication terminal further stores the identity of the HPLMN. According to the present embodiment, the identity of the HPLMN further includes an identity of an EHPLMN. The identity of the current VPLMN and the identity of the HPLMN in the network record document of the mobile communication terminal are simultaneously added to the EPLMN list so as to provide resources for network searching. The identity of the current VPLMN and the identity of the HPLMN are added to the EPLMN list. An equivalent relationship is between the VPLMN and the EHPLMN, that is, they have a same priority during a network searching process.

Block S103: A network search is performed according to the EPLMN list.

In greater detail, a synchronous network search for information of a plurality of EPLMNs in the EPLMN list is performed according to the EPLMN list of the mobile communication terminal thus added.

Block S104: A network registration operation of the mobile communication terminal is performed when any one network in the EPLMN list is searched.

In greater detail, when the any one network in the EPLMN list is searched, the network registration of the mobile communication terminal is then performed. The any one network includes the EPLMN of any one of the VPLMN and the HPLMN of the mobile communication terminal in the EPLMN list. If a home location is China, the network registration operation can be performed according to a network code when China Unicorn 46001 is searched.

According to the embodiments of the present disclosure, identification of the current VPLMN is obtained and stored in the network record document of the mobile communication terminal when the identification of the current VPLMN does not exist in the network record document of the mobile communication terminal. The identification of the current VPLMN and the identification of the HPLMN in the network record document of the mobile communication terminal are added to the EPLMN list simultaneously. The network search is performed according to the EPLMN list. The network registration operation of the mobile communication terminal is performed when any one network in the EPLMN list is searched. Through obtaining the identification of the current VPLMN of the mobile communication terminal and storing the identification of the current VPLMN in the network record document, the network searching is simultaneously performed by simultaneously adding the identification of the current VPLMN and the identification of the HPLMN in the network record document to the EPLMN list. In this manner, the success rate and speed of the mobile communication terminal to access the network at the current visited location can be greatly improved, which is very advantageous to shorten the standby time of the user when communicating (ideally the mobile communication terminal could only need a few seconds to complete the network access). As a result, it is very advantageous to improve the user experience in communication.

Figure 2:
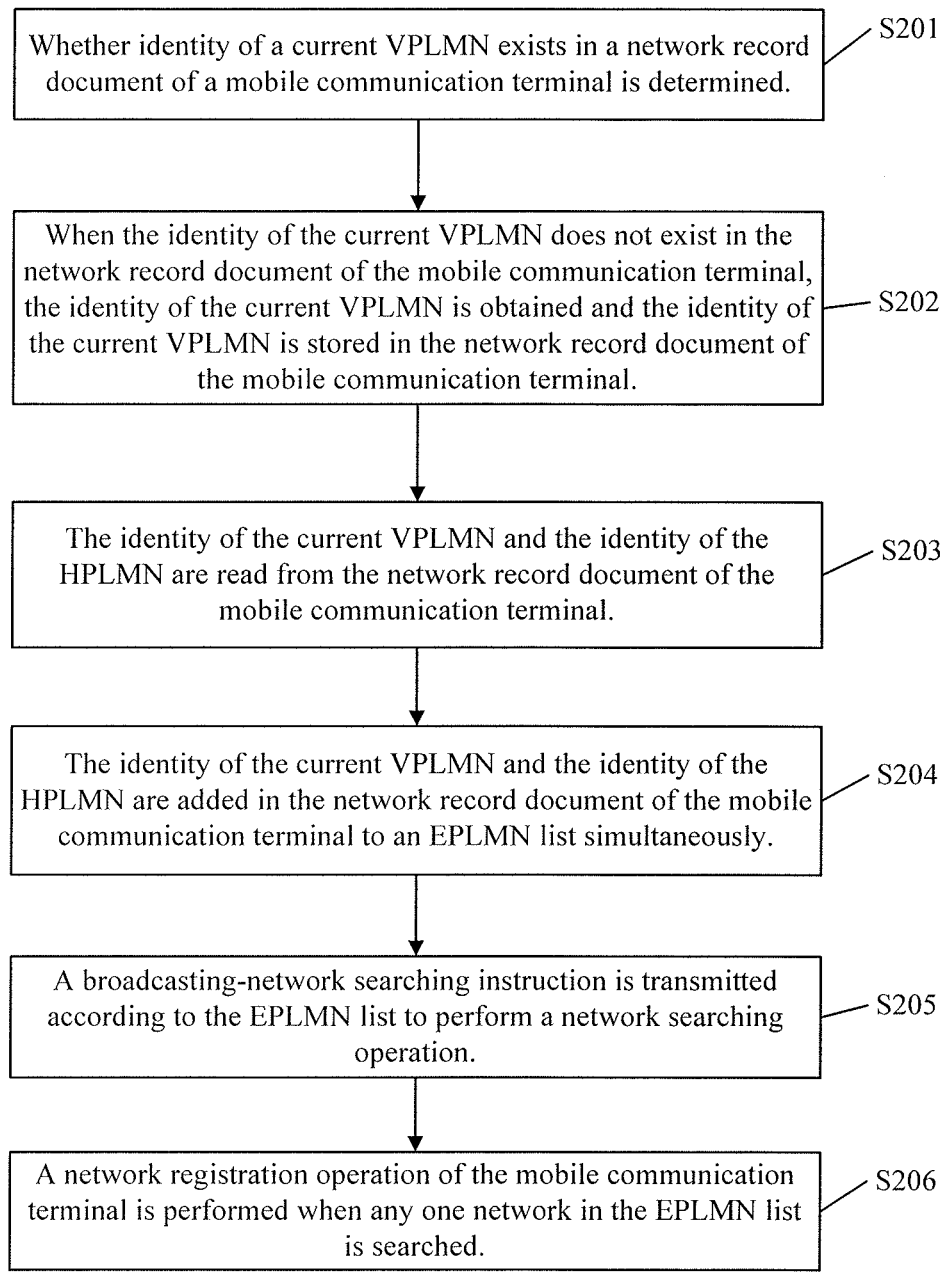
FIG. 2 is a flow chart of a method for connecting to a network according to another embodiment of the present disclosure.

A description is provided with reference to FIG. 2. FIG. 2 is a flowchart of another method of accessing a network according to one embodiment of the present disclosure. The method includes the following blocks:

Block S201: Whether an identity of a current VPLMN exists in a network record document of a mobile communication terminal is determined.

In greater detail, block S201 may specifically include block A and block B:

Block A: Determine whether a signal intensity of a HPLMN is lower than a preset network threshold value.

In greater detail, when the mobile communication terminal roams in another country and is turned on again, the mobile communication terminal does not know that it is in a roaming state and continues to search an RPLMN. Since the RPLMN does not exist in the roaming area, network searching will fail and a large amount of time is wasted in network searching. In the present embodiment, when a weaker signal is searched by the mobile communication terminal, whether the signal intensity of the HPLMN of the mobile communication terminal is lower than the preset network threshold value is determined so as to determine whether a subscriber carrying the mobile communication terminal is located at a home location, located at a visited location, or located in a geographical_range between the home location and the visited location. The preset network threshold value is used for judging a current signal intensity so as to determine whether it is necessary to switch a network. When the subscriber carrying the mobile communication terminal goes from the home location to the visited location, the mobile communication terminal will search the HPLMN if the mobile communication terminal is located within an effective range of the HPLMN. When the HPLMN thus searched becomes increasingly weaker until lower than the preset network threshold value, a network search is performed.

Block B: determine whether the identity of the current VPLMN exists in the network record document of the mobile communication terminal when the signal intensity of the HPLMN is lower than the preset network threshold value.

In greater detail, whether the identity of the current VPLMN exists in the network record document of the mobile communication terminal is determined when the signal intensity of the HPLMN is lower than the preset network threshold value. The network record document of the mobile communication terminal refers to a document in the mobile communication terminal used for recording network identity information, such as an embedded file system (EFS). When the subscriber carrying the mobile communication terminal comes to a specific visited location for the first time, there is no record of the visited location in the network record document of the mobile communication terminal, that is, an identity of a VPLMN does not exist. Then, it is necessary to add the identity of the VPLMN to the network record document of the mobile communication terminal to facilitate the subscriber carrying the mobile communication terminal to obtain the identity of the VPLMN through reading the network record document when coming to the visited location for the second time or for many times subsequently. When the subscriber carrying the mobile communication terminal comes to the visited location after the first time, there is the record of the visited location in the network record document of the mobile communication terminal, that is, the identity of the VPLMN exists. Then, the identity of the VPLMN in the network record document can be directly read through the mobile communication terminal. When the identity of the VPLMN exists in the network record document of the mobile communication terminal, it shows that the subscriber carrying the mobile communication terminal has come to the visited location for two times or for many times. When the subscriber carrying the mobile communication terminal came to the visited location for the first time, the identity of the VPLMN was stored in the network record document of the mobile communication terminal, and the identity of the VPLMN and an identity of the HPLMN were added to an EPLMN list. If the identity of the current VPLMN does not exist in the network record document of the mobile communication terminal, block S203 is executed.

Block S202: When the identity of the current VPLMN does not exist in the network record document of the mobile communication terminal, the identity of the current VPLMN is obtained and the identity of the current VPLMN is stored in the network record document of the mobile communication terminal.

In greater detail, when the identity of the VPLMN does not exist in the network record document of the mobile communication terminal, it shows that the subscriber carrying the mobile communication terminal comes to the visited location for the first time or records the identity of the VPLMN in the network record document of the mobile communication terminal for the first time. The identity of the VPLMN is obtained manually or through some other sharing method and is stored in the network record document of the mobile communication terminal.

Block S203: The identity of the current VPLMN and the identity of the HPLMN are read from the network record document of the mobile communication terminal.

In greater detail, read the identity of the current VPLMN and the identity of the HPLMN through the network record document of the mobile communication terminal. The identity of the HPLMN has already been stored in the network record document of the mobile communication terminal when network searching is first performed. The identity of the HPLMN includes an identity of an HPLMN matching a USIM of the mobile communication terminal and an identity of an EHPLMN.

Block S204: The identity of the current VPLMN and the identity of the HPLMN are added in the network record document of the mobile communication terminal to an EPLMN list simultaneously.

In greater detail, the EPLMN list is mainly configured to store identity information of a plurality of EPLMNs. In block S203, the identity of the VPLMN thus obtained is stored in the network record document of the mobile communication terminal. The network record document of the mobile communication terminal further stores the identity of the HPLMN. According to the present embodiment, the identity of the HPLMN further includes the identity of the EHPLMN. The identity of the current VPLMN and the identity of the HPLMN in the network record document of the mobile communication terminal are simultaneously added to the EPLMN list so as to provide resources for network searching. The identity of the current VPLMN and the identity of the HPLMN are added to the EPLMN list. An equivalent relationship is between the VPLMN and the EHPLMN, that is, they have a same priority during a network searching process.

Block S205: A broadcasting-network searching instruction is transmitted according to the EPLMN list to perform a network searching operation.

In greater detail, the EPLMN list is mainly configured to store identity information of a plurality of EPLMNs. A synchronous network search is performed for the identity of the VPLMN and the identity of the HPLMN of the mobile communication terminal in the EPLMN list according to the EPLMN list thus added. All VPLMNs and the HPLMN in the EPLMN list have a same priority. When the search is performed, the mobile communication terminal needs to generate the broadcasting-network searching instruction including the information of the EPLMNs in the EPLMN list according to the EPLMN list, receive a broadcast message that corresponds to the EPLMN list, and perform network searching.

Block S206: A network registration operation of the mobile communication terminal is performed when any one network in the EPLMN list is searched.

In greater detail, when the any one network in the EPLMN list is searched, the network registration of the mobile communication terminal is then performed. The any one network includes the EPLMN of any of the VPLMNs and the HPLMN of the mobile communication terminal in the EPLMN list. If a home location is China, the network registration operation can be performed according to a network code when China Unicorn 46001 is searched.

According to the embodiments of the present disclosure, identification of the current VPLMN is obtained and stored in the network record document of the mobile communication terminal when the identification of the current VPLMN does not exist in the network record document of the mobile communication terminal. The identification of the current VPLMN and the identification of the HPLMN in the network record document of the mobile communication terminal are added to the EPLMN list simultaneously. The network search is performed according to the EPLMN list. The network registration operation of the mobile communication terminal is performed when any one network in the EPLMN list is searched. Through obtaining the identification of the current VPLMN of the mobile communication terminal and storing the identification of the current VPLMN in the network record document, the network searching is simultaneously performed by simultaneously adding the identification of the current VPLMN and the identification of the HPLMN in the network record document to the EPLMN list. In this manner, the success rate and speed of the mobile communication terminal to access the network at the current visited location can be greatly improved, which is very advantageous to shorten the standby time of the user when communicating (ideally the mobile communication terminal could only need a few seconds to complete the network access). As a result, it is very advantageous to improve the user experience in communication.

Figure 3:
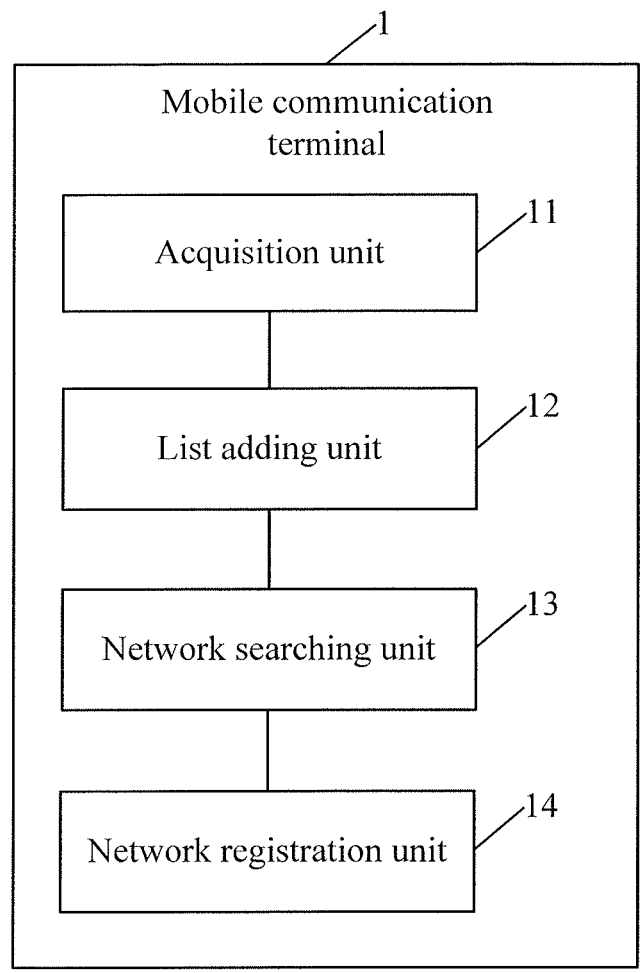
FIG. 3 is a block diagram of a mobile communication terminal according to a first embodiment of the present disclosure.
Figure 4:
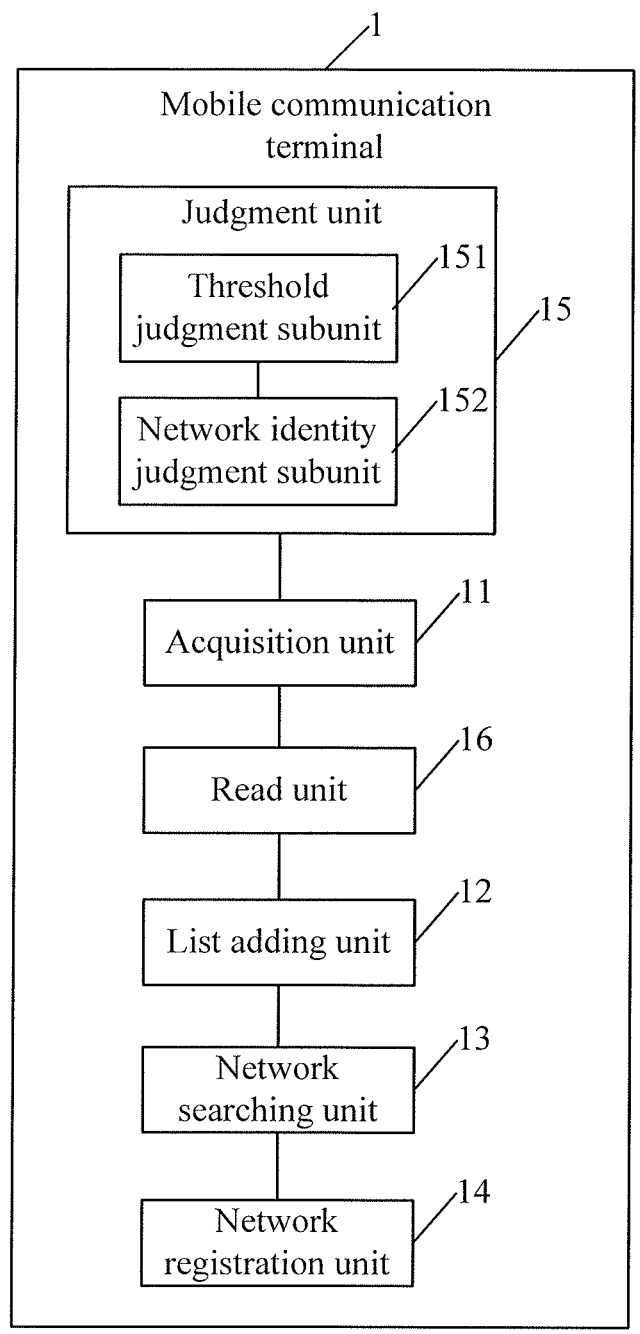
FIG. 4 is a block diagram of a mobile communication terminal according to a second embodiment of the present disclosure.

Descriptions are provided with reference to FIG. 3 to FIG. 4 as follows to provide detailed illustrations of mobile communication terminals according to embodiments of the present disclosure. It is noted that the mobile communication terminals shown in FIG. 3 to FIG. 4 are configured to perform the method of accessing a networks shown in FIG. 1 to FIG. 2. To simplify matters, only parts relevant to the embodiments of present disclosure are shown, and technical details not disclosed may refer to the embodiments shown in FIG. 1 to FIG. 2 of the present disclosure.

A description is provided with reference to FIG. 3. FIG. 3 is a block diagram of a mobile communication terminal according to a first embodiment of the present disclosure. A mobile communication terminal 1 includes an acquisition unit 11, a list adding unit 12, a network searching unit 13, and a network registration unit 14.

The acquisition unit 11 is configured to obtain the identity of the VPLMN and store the identity of the VPLMN in the network record document of the mobile communication terminal when the identity of the VPLMN does not exist in the network record document of the mobile communication terminal.

In greater detail, the network record document of the mobile communication terminal refers to a document in the mobile communication terminal used for recording network identity information, such as an embedded file system (EFS). When a subscriber carrying the mobile communication terminal comes to a specific visited location for the first time, there is no record of the visited location in the network record document of the mobile communication terminal, that is, an identity of a VPLMN does not exist. Then, it is necessary to add the identity of the VPLMN to the network record document of the mobile communication terminal to facilitate the subscriber carrying the mobile communication terminal to obtain the identity of the VPLMN through reading the network record document when coming to the visited location for the second time or for many times subsequently. When the subscriber carrying the mobile communication terminal comes to the visited location after the first time, there is the record of the visited location in the network record document of the mobile communication terminal, that is, the identity of the VPLMN exists. Then, the identity of the VPLMN in the network record document can be directly read through the mobile communication terminal.

The list adding unit 12 is configured to add the identity of the VPLMN and the identity of the HPLMN to the EPLMN list.

In greater detail, the EPLMN list is mainly configured to store identity information of a plurality of EPLMNs. The identity information of the plurality of EPLMNs stored in the EPLMN list is provided as resources for network searching. The identity of the current VPLMN and the identity of the HPLMN are added to the EPLMN list. An equivalent relationship is between the VPLMN and the EHPLMN, that is, they have a same priority during a network searching process.

The network searching unit 13 is configured to perform the network search according to the EPLMN list.

In greater detail, a synchronous network search for information of a plurality of EPLMNs in the EPLMN list is performed according to the EPLMN list of the mobile communication terminal thus added.

The network registration unit 14 is configured to perform the network registration operation of the mobile communication terminal when the any one network in the EPLMN list is searched.

In greater detail, when the any one network in the EPLMN list is searched, the network registration of the mobile communication terminal is then performed. The any one network includes the EPLMN of any one of the VPLMN and the EHPLMN of the mobile communication terminal in the EPLMN list. If a home location is China, the network registration operation can be performed according to a network code when China Unicorn 46001 is searched.

According to the embodiments of the present disclosure, identification of the current VPLMN is obtained and stored in the network record document of the mobile communication terminal when the identification of the current VPLMN does not exist in the network record document of the mobile communication terminal. The identification of the current VPLMN and the identification of the HPLMN in the network record document of the mobile communication terminal are added to the EPLMN list simultaneously. The network search is performed according to the EPLMN list. The network registration operation of the mobile communication terminal is performed when any one network in the EPLMN list is searched. Through obtaining the identification of the current VPLMN of the mobile communication terminal and storing the identification of the current VPLMN in the network record document, the network searching is simultaneously performed by simultaneously adding the identification of the current VPLMN and the identification of the HPLMN in the network record document to the EPLMN list. In this manner, the success rate and speed of the mobile communication terminal to access the network at the current visited location can be greatly improved, which is very advantageous to shorten the standby time of the user when communicating (ideally the mobile communication terminal could only need a few seconds to complete the network access). As a result, it is very advantageous to improve the user experience in communication.

A description is provided with reference to FIG. 4. FIG. 4 is a block diagram of a mobile communication terminal according to a second embodiment of the present disclosure. A mobile communication terminal 1 includes the acquisition unit 11, the list adding unit 12, the network searching unit 13, the network registration unit 14, a judgment unit 15, and a read unit 16. The judgment unit 15 includes a threshold judgment subunit 151, and a network identity judgment subunit 152.

The judgment unit 15 is configured to determine whether the identity of the current VPLMN exists in the network record document of the mobile communication terminal.

The threshold judgment subunit 151 is configured to determine whether the signal intensity of the HPLMN is lower than the preset network threshold value.

In greater detail, when the mobile communication terminal roams in another country and is turned on again, the mobile communication terminal does not know that it is in a roaming state and continues to search an RPLMN. Since the RPLMN does not exist in the roaming area, network searching will fail and a large amount of time is wasted in network searching. In the present embodiment, when a weaker signal is searched by the mobile communication terminal, whether the signal intensity of the HPLMN of the mobile communication terminal is lower than the preset network threshold value is determined so as to determine whether a subscriber carrying the mobile communication terminal is located at a home location, located at a visited location, or located in a geographical_range between the home location and the visited location. The preset network threshold value is used for judging a current signal intensity so as to determine whether it is necessary to switch a network. When the subscriber carrying the mobile communication terminal goes from the home location to the visited location, the mobile communication terminal will search the HPLMN if the mobile communication terminal is located within an effective range of the HPLMN. When the HPLMN thus searched becomes increasingly weaker until lower than the preset network threshold value, a network search is performed.

The network identity judgment subunit 152 is configured to determine whether the identity of the current VPLMN exists in the network record document of the mobile communication terminal when the signal intensity of the HPLMN is lower than the preset network threshold value.

In greater detail, whether the identity of the current VPLMN exists in the network record document of the mobile communication terminal is determined when the signal intensity of the HPLMN is lower than the preset network threshold value. The network record document of the mobile communication terminal refers to a document in the mobile communication terminal used for recording network identity information, such as an embedded file system (EFS). When the subscriber carrying the mobile communication terminal comes to a specific visited location for the first time, there is no record of the visited location in the network record document of the mobile communication terminal, that is, an identity of a VPLMN does not exist. Then, it is necessary to add the identity of the VPLMN to the network record document of the mobile communication terminal to facilitate the subscriber carrying the mobile communication terminal to obtain the identity of the VPLMN through reading the network record document when coming to the visited location for the second time or for many times subsequently. When the subscriber carrying the mobile communication terminal comes to the visited location after the first time, there is the record of the visited location in the network record document of the mobile communication terminal, that is, the identity of the VPLMN exists. Then, the identity of the VPLMN in the network record document can be directly read through the mobile communication terminal. When the identity of the VPLMN exists in the network record document of the mobile communication terminal, it shows that the subscriber carrying the mobile communication terminal has come to the visited location for two times or for many times. When the subscriber carrying the mobile communication terminal came to the visited location for the first time, the identity of the VPLMN was stored in the network record document of the mobile communication terminal, and the identity of the VPLMN and an identity of the HPLMN were added to an EPLMN list. If the identity of the current VPLMN does not exist in the network record document of the mobile communication terminal.

The acquisition unit 11 is configured to obtain the identity of the VPLMN and store the identity of the VPLMN in the network record document of the mobile communication terminal when the identity of the VPLMN does not exist in the network record document of the mobile communication terminal.

In greater detail, when the identity of the VPLMN does not exist in the network record document of the mobile communication terminal, it shows that the subscriber carrying the mobile communication terminal comes to the visited location for the first time or records the identity of the VPLMN in the network record document of the mobile communication terminal for the first time. The identity of the VPLMN is obtained manually or through some other sharing method and is stored in the network record document of the mobile communication terminal.

The read unit 26 is configured to read the identity of the VPLMN from the network record document of the mobile communication terminal.

In greater detail, read the identity of the current VPLMN through the network record document of the mobile communication terminal. The network record document storing the VPLMN indicates to the network record document storing the identity of the VPLMN.

The list adding unit 27 is configured to add the identity of the VPLMN and the identity of the HPLMN to the EPLMN list.

In greater detail, the EPLMN list is mainly configured to store identity information of a plurality of EPLMNs. The identity information of the plurality of EHPLMN extracted by the mobile communication terminal will be stored in the EPLMN list, so as to provide resources for network searching. The VPLMN and the EHPLMN are added to the EPLMN list. An equivalent relationship is between the VPLMN and the EHPLMN, that is, they have a same priority during a network searching process.

The network searching unit 28 is configured to transmit the broadcasting-network searching instruction according to the EPLMN list so as to perform the network searching operation.

In greater detail, the EPLMN list is mainly configured to store identity information of a plurality of EPLMNs. A synchronous network search is performed for the identity of the VPLMN and the identity of the EHPLMN of the mobile communication terminal in the EPLMN list according to the EPLMN list thus added. All VPLMNs and the EHPLMN in the EPLMN list have a same priority. When the search is performed, the mobile communication terminal needs to generate the broadcasting-network searching instruction including the information of the EPLMNs in the EPLMN list according to the EPLMN list, receive a broadcast message that corresponds to the EPLMN list, and perform network searching.

The network registration unit 29 is configured to perform the network registration operation of the mobile communication terminal when the any one network in the EPLMN list is searched.

In greater detail, when the any one network in the EPLMN list is searched, the network registration of the mobile communication terminal is then performed. The any one network includes the EPLMN of any of the VPLMNs and the EHPLMN of the mobile communication terminal in the EPLMN list. If a home location is China, the network registration operation can be performed according to a network code when China Unicorn 46001 is searched.

According to the embodiments of the present disclosure, identification of the current VPLMN is obtained and stored in the network record document of the mobile communication terminal when the identification of the current VPLMN does not exist in the network record document of the mobile communication terminal. The identification of the current VPLMN and the identification of the HPLMN in the network record document of the mobile communication terminal are added to the EPLMN list simultaneously. The network search is performed according to the EPLMN list. The network registration operation of the mobile communication terminal is performed when any one network in the EPLMN list is searched. Through obtaining the identification of the current VPLMN of the mobile communication terminal and storing the identification of the current VPLMN in the network record document, the network searching is simultaneously performed by simultaneously adding the identification of the current VPLMN and the identification of the HPLMN in the network record document to the EPLMN list. In this manner, the success rate and speed of the mobile communication terminal to access the network at the current visited location can be greatly improved, which is very advantageous to shorten the standby time of the user when communicating (ideally the mobile communication terminal could only need a few seconds to complete the network access). As a result, it is very advantageous to improve the user experience in communication.

Figure 5:
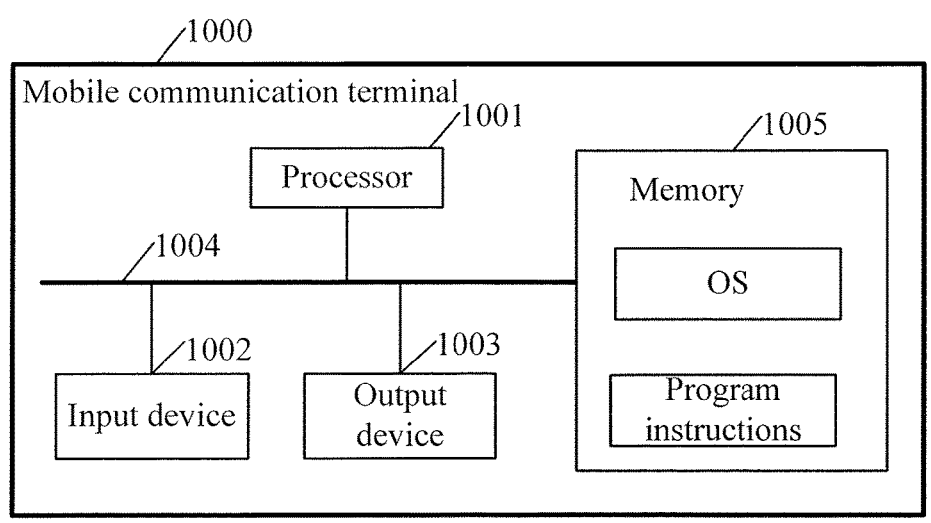
FIG. 5 is a block diagram of a mobile communication terminal according to a third embodiment of the present disclosure.

FIG. 5 is a block diagram of a mobile communication terminal according to a third embodiment of the present disclosure. The mobile communication terminal is configured to perform the above method of accessing a network. A mobile communication terminal 1000 may include: elements such as at least one processor 1001, at least one input device 1002, at least one output device 1003, and a memory 1005. These elements are communicatively connected through one or a plurality of buses 1004. Those of ordinary skill in the art would understand that the embodiment of the present disclosure is not limited to the structure of the mobile communication terminal shown in FIG. 5. It may be either a bus-type structure or a star-type structure, or may include more or fewer elements than illustrated, or some elements may be combined, or the elements may be arranged differently. The processor 1001 is a control center of the mobile communication terminal 1000. The processor 1001 is connected to various parts of the mobile communication terminal 1000 by utilizing various ports and circuits. Through running or executing a program and/or a module stored in the memory 1005, and using data stored in the memory 1005, the processor 1001 performs a variety of functions of the mobile communication terminal and processes data. The processor 1001 may be constituted by an integrated circuit (IC), for example, it may be formed by a single packaged IC, or may be formed by connecting a plurality of packaged ICs having a same function or different functions. For example, the processor 1001 may only include a central processing unit (CPU), or may be a combination of a CPU, a digital signal processor (DSP), a graphic processing unit (GPU), and various types of control chips. In the embodiment of the present disclosure, the CPU may be a single-core CPU or may include a multi-core CPU.

The input device 1002 includes a standard touch panel, a standard keyboard, etc., and may also include a wired interface, a wireless interface, etc.

The output device 1003 includes a display panel, a speaker, etc., and may also include a wired interface, a wireless interface etc.

The memory 1005 may be configured to store a software program instructions and the module. The processor 1001, the input device 1002, and the output device 1003 performs a variety of functional applications of the mobile communication terminal and achieve data processing through using the software program and the module stored in the memory 1005. The memory 1005 mainly includes a program storage area and a data storage area. The program storage area may store an operating system, an application program required by at least one function, or the like. The data storage area may store data or the like created according to uses of the mobile communication terminal. In the embodiment of the present disclosure, the operating system may be an Android system, an iOS system, a Windows operating system, or the like.

In greater detail, the processor 1001 executes the program instructions stored in the memory 1005 to perform the following operations:

obtaining an identity of a current Visited Public Land Mobile Network (VPLMN) and storing the identity of the current VPLMN in a network record document of a mobile communication terminal when the identity of the current VPLMN does not exist in the network record document of the mobile communication terminal;

adding the identity of the current VPLMN and an identity of a Home Public Land Mobile Network (HPLMN) in the network record document of the mobile communication terminal to an Equivalent Public Land Mobile Network (EPLMN) list simultaneously;

performing a network search according to the EPLMN list; and performing a network registration operation of the mobile communication terminal when any one network in the EPLMN list is searched.

Optionally, the processor 1001 further executes the plurality of program instructions stored in the memory 1005 to perform the following step before obtaining an identity of a current Visited Public Land Mobile Network (VPLMN) and storing the identity of the current VPLMN in a network record document of a mobile communication terminal when the identity of the current VPLMN does not exist in the network record document of the mobile communication terminal:

determining whether the identity of the current VPLMN exists in the network record document of the mobile communication terminal.

Optionally, the processor 1001 further executes the plurality of program instructions to perform the following step before adding the identity of the current VPLMN and an identity of a Home Public Land Mobile Network (HPLMN) in the network record document of the mobile communication terminal to an Equivalent Public Land Mobile Network (EPLMN) list simultaneously:

reading the identity of the current VPLMN and the identity of the HPLMN from the network record document of the mobile communication terminal.

Optionally, when the processor 1001 executes the plurality of program instructions to perform the step of performing a network search according to the EPLMN list, the processor 1001 executes the plurality of program instructions to perform the following step:

transmitting a broadcasting-network access instruction according to the EPLMN list thus added to perform a network searching operation.

Optionally, when the processor 1001 executes the plurality of program instructions to perform the step of determining whether the identity of the current VPLMN exists in the network record document of the mobile communication terminal, the processor executes the plurality of program instructions to perform the following step:

determining whether a signal intensity of the HPLMN is lower than a preset network threshold value; and determining whether the identity of the current VPLMN exists in the network record document of the mobile communication terminal when the signal intensity of the HPLMN is lower than the preset network threshold value.

According to the embodiments of the present disclosure, identification of the current VPLMN is obtained and stored in the network record document of the mobile communication terminal when the identification of the current VPLMN does not exist in the network record document of the mobile communication terminal. The identification of the current VPLMN and the identification of the HPLMN in the network record document of the mobile communication terminal are added to the EPLMN list simultaneously. The network search is performed according to the EPLMN list. The network registration operation of the mobile communication terminal is performed when any one network in the EPLMN list is searched. Through obtaining the identification of the current VPLMN of the mobile communication terminal and storing the identification of the current VPLMN in the network record document, the network searching is simultaneously performed by simultaneously adding the identification of the current VPLMN and the identification of the HPLMN in the network record document to the EPLMN list. In this manner, the success rate and speed of the mobile communication terminal to access the network at the current visited location can be greatly improved, which is very advantageous to shorten the standby time of the user when communicating (ideally the mobile communication terminal could only need a few seconds to complete the network access). As a result, it is very advantageous to improve the user experience in communication.

It is noted that, to simplify matters, each of the above method embodiments is described as a combination of a series of actions. However, those of ordinary skill in the art would understand that the present disclosure is not limited to the described sequence of actions since certain steps may be performed in other sequences or may be simultaneously performed according to the present disclosure. Moreover, those of ordinary skill in the art would understand that the embodiments described in the specification are all preferred embodiments, and the actions and module involved are not necessarily essential to the present disclosure.

In the above embodiments, the description of each of the embodiments has its own focus, and portions that are not described in detail in one embodiment can refer to the relevant description of another embodiment.

Through the description of the above embodiments, those of ordinary skill in the art can clearly understand that the present disclosure may be realized by using hardware, firmware, or a combination thereof. When the software is utilized, the above functions may be stored in a computer readable medium or may be one or a plurality of instructions or code in the computer readable medium that is transmitted. The computer readable medium includes a computer storage medium and a communication medium. The communication medium includes any medium that facilitates a computer program to be transmitted from one place to another place. A storage medium may be any usable medium that a computer can access. The computer readable medium may include but is not limited to a random access memory (RAM), a read-only Memory (ROM), an electrically erasable programmable read-only memory (EEPROM), a compact disc read-only memory (CD-ROM), or some other optical disc storage, a magnetic disk storage medium, or some other magnetic storage device, or any other medium that can be hand carried or can store expected program code in a form of instruction or data and can be accessed by a computer. In addition, any connection may be the computer readable medium if appropriate. For example, if the software is transmitted from a website, a server, or some other remote source by using a coaxial cable, a fiber optic cable, a twisted pair cable, a digital subscriber line (DSL), or a wireless technology, such as infrared, radio, and microwave, then the coaxial cable, the fiber optic cable, the twisted pair cable, the DSL, or the wireless technology, such as infrared, radio, or microwave is included in fixing of the medium. As used herein, "Disk" and "disc" include a compact disc (CD), a laser disc, an optical disc, a digital versatile disc (DVD), a floppy disk, or a Blu-ray disc. "Disk" usually magnetically replicates data whereas "disc" uses laser light to optically replicate data. The above combinations should also be within the protection range of the computer-readable media.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method of accessing a network, performed by a mobile communication terminal, comprising:
   obtaining an identity of a current Visited Public Land Mobile Network (VPLMN) and storing the identity of the current VPLMN in a network record document of the mobile communication terminal when the identity of the current VPLMN does not exist in the network record document of the mobile communication terminal;
   adding the identity of the current VPLMN, an identity of a Home Public Land Mobile Network (HPLMN) matching a universal subscriber identity module (USIM) of the mobile communication terminal and an identity of an equivalent home public land mobile network (EHPLMN) in the network record document of the mobile communication terminal to an Equivalent Public Land Mobile Network (EPLMN) list simultaneously, the current VPLMN and the HPLMN having a same priority during network searching, wherein the EHPLMN is a local PLMN of currently visited location which has the same priority as the VPLMN and the HPLMN;
   performing a synchronous network search according to the EPLMN list added with the identity of the current VPLMN, the identity of the HPLMN matching the USIM of the mobile communication terminal and the identity of the EHPLMN, wherein performing the synchronous network search according to the EPLMN list comprises transmitting a broadcasting-network access instruction according to the EPLMN list added with the identity of the current VPLMN, the identity of the HPLMN matching the USIM of the mobile communication terminal and the identity of the EHPLMN to perform a network searching operation; and
   performing a network registration operation of the mobile communication terminal when any one network in the EPLMN list is searched.

2. The method as claimed in claim 1, wherein the method further comprises the following step before obtaining the identity of the current VPLMN and storing the identity of the current VPLMN in the network record document of the mobile communication terminal when the identity of the current VPLMN does not exist in the network record document of the mobile communication terminal:
   determining whether the identity of the current VPLMN exists in the network record document of the mobile communication terminal.

3. The method as claimed in claim 1, wherein the method further comprises the following step before adding the identity of the current VPLMN, the identity of the HPLMN matching the USIM of the mobile communication terminal and the identity of the EHPLMN in the network record document of the mobile communication terminal to the EPLMN list simultaneously:
   reading the identity of the current VPLMN and the identity of the HPLMN from the network record document of the mobile communication terminal.

4. The method as claimed in claim 3, wherein performing the network search according to the EPLMN list comprises:
   transmitting a broadcasting-network access instruction according to the EPLMN list added with the identity of the current VPLMN, the identity of the HPLMN matching the USIM of the mobile communication terminal and the identity of the EHPLMN to perform a network searching operation.

5. The method as claimed in claim 2, wherein determining whether the identity of the current VPLMN exists in the network record document of the mobile communication terminal comprises:
   determining whether a signal intensity of the HPLMN is lower than a preset network threshold value; and
   determining whether the identity of the current VPLMN exists in the network record document of the mobile communication terminal when the signal intensity of the HPLMN is lower than the preset network threshold value.

6. A mobile communication terminal comprising:
   a processor; and
   a memory connected with the processor, the memory storing a plurality of program instructions executable by the processor, the plurality of program instructions comprising:
   an acquisition unit, configured to cause the processor to obtain an identity of a current VPLMN and store the identity of the current VPLMN in a network record document of the mobile communication terminal when the identity of the current VPLMN does not exist in the network record document of the mobile communication terminal;
    a list adding unit, configured to cause the processor to add the identity of the current VPLMN, an identity of an HPLMN matching a universal subscriber identity module (USIM) of the mobile communication terminal and an identity of an equivalent home public land mobile network (EHPLMN) in the network record document of the mobile communication terminal to an EPLMN list simultaneously, the current VPLMN and the HPLMN having a same priority during network searching, wherein the EHPLMN is a local PLMN of currently visited location which has the same priority as the VPLMN and the HPLMN;
    a network searching unit, configured to cause the processor to perform a synchronous network search according to the EPLMN list added with the identity of the current VPLMN, the identity of the HPLMN matching the USIM of the mobile communication terminal and the identity of the EHPLMN, and wherein the network searching unit is configured to cause the processor to transmit a broadcasting-network searching instruction according to the EPLMN list added with the identity of the current VPLMN, the identity of the HPLMN matching the USIM of the mobile communication terminal and the identity of the EHPLMN so as to perform a network searching operation; and
    a network registration unit, configured to cause the processor to perform a network registration operation of the mobile communication terminal when any one network in the EPLMN list is searched.

7. The mobile communication terminal as claimed in claim 6, further comprising:
    a judgment unit, configured to cause the processor to determine whether the identity of the current VPLMN exists in the network record document of the mobile communication terminal.

8. The mobile communication terminal as claimed in claim 6, further comprising:
    a read unit, configured to cause the processor to read the identity of the VPLMN, the identity of the HPLMN matching the USIM of the mobile communication terminal and the identity of the EHPLMN from the network record document of the mobile communication terminal.

9. The mobile communication terminal as claimed in claim 8, wherein the network searching unit is configured to cause the processor to transmit a broadcasting-network searching instruction according to the EPLMN list added with the identity of the current VPLMN, the identity of the HPLMN matching the USIM of the mobile communication terminal and the identity of the EHPLMN so as to perform a network searching operation.

10. The mobile communication terminal as claimed in claim 7, wherein the judgment unit comprises:
    a threshold judgment subunit, configured to cause the processor to determine whether a signal intensity of the HPLMN is lower than a preset network threshold value;
    a network identity judgment subunit, configured to cause the processor to determine whether the identity of the current VPLMN exists in the network record document of the mobile communication terminal when the signal intensity of the HPLMN is lower than the preset network threshold value.

11. A mobile communication terminal comprising a processor and a memory storing a plurality of program instructions executable by the processor to perform the following steps:
    obtaining an identity of a current Visited Public Land Mobile Network (VPLMN) and storing the identity of the current VPLMN in a network record document of a mobile communication terminal when the identity of the current VPLMN does not exist in the network record document of the mobile communication terminal;
    adding the identity of the current VPLMN and an identity of a Home Public Land Mobile Network (HPLMN) matching a universal subscriber identity module (USIM) of the mobile communication terminal and an identity of an equivalent home public land mobile network (EHPLMN) in the network record document of the mobile communication terminal to an Equivalent Public Land Mobile Network (EPLMN) list simultaneously, the current VPLMN and the HPLMN having a same priority during network searching, wherein the EHPLMN is a local PLMN of currently visited location which has the same priority as the VPLMN and the HPLMN;
    performing a synchronous network search according to the EPLMN list added with the identity of the current VPLMN and the identity of the HPLMN, wherein performing the synchronous network search according to the EPLMN list comprises transmitting a broadcasting-network access instruction according to the EPLMN list added with the identity of the current VPLMN, the identity of the HPLMN matching the USIM of the mobile communication terminal and the identity of the EHPLMN to perform a network searching operation; and
    performing a network registration operation of the mobile communication terminal when any one network in the EPLMN list is searched.

12. The mobile communication terminal as claimed in claim 11, wherein the processor further executes the plurality of program instructions to perform the following step before obtaining an identity of a current Visited Public Land Mobile Network (VPLMN) and storing the identity of the current VPLMN in a network record document of a mobile communication terminal when the identity of the current VPLMN does not exist in the network record document of the mobile communication terminal:
    determining whether the identity of the current VPLMN exists in the network record document of the mobile communication terminal.

13. The mobile communication terminal as claimed in claim 11, wherein the processor further executes the plurality of program instructions to perform the following step before adding the identity of the current VPLMN, an identity of a Home Public Land Mobile Network (HPLMN) matching the USIM of the mobile communication terminal and the identity of the EHPLMN in the network record document of the mobile communication terminal to an Equivalent Public Land Mobile Network (EPLMN) list simultaneously:
    reading the identity of the current VPLMN, the identity of the HPLMN matching the USIM of the mobile communication terminal and the identity of the EHPLMN from the network record document of the mobile communication terminal.

14. The mobile communication terminal as claimed in claim 13, wherein when the processor executes the plurality of program instructions to perform the step of performing a network search according to the EPLMN list, the processor executes the plurality of program instructions to perform the following step:

transmitting a broadcasting-network access instruction according to the EPLMN list added with the identity of the current VPLMN, the identity of the HPLMN matching the USIM of the mobile communication terminal and the identity of the EHPLMN to perform a network searching operation.

15. The mobile communication terminal as claimed in claim 12, wherein when the processor executes the plurality of program instructions to perform the step of determining whether the identity of the current VPLMN exists in the network record document of the mobile communication terminal, the processor executes the plurality of program instructions to perform the following step:

determining whether a signal intensity of the HPLMN is lower than a preset network threshold value; and determining whether the identity of the current VPLMN exists in the network record document of the mobile communication terminal when the signal intensity of the HPLMN is lower than the preset network threshold value.

\* \* \* \* \*